United States Patent
Christensen et al.

(10) Patent No.: US 11,641,663 B2
(45) Date of Patent: May 2, 2023

(54) SELECTIVE TRANSMISSIONS IN WIRELESS DEVICE

(71) Applicant: Nokia Technologies Oy, Espoo (FI)

(72) Inventors: Lars Holst Christensen, Aalborg (DK); Bent Henneberg Rysgaard, Aalborg (DK); Karsten A Petersen, Aalborg (DK); Rafhael Amorim, Aalborg (DK); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/068,237

(22) Filed: Oct. 12, 2020

(65) Prior Publication Data

US 2021/0112571 A1 Apr. 15, 2021

(30) Foreign Application Priority Data

Oct. 15, 2019 (FI) ...................................... 20195887

(51) Int. Cl.
*H04W 72/12* (2009.01)
*H04L 5/00* (2006.01)

(52) U.S. Cl.
CPC ....... *H04W 72/1231* (2013.01); *H04L 5/0044* (2013.01)

(58) Field of Classification Search
CPC ..... H04L 1/0026; H04L 43/10; H04L 1/1854; H04L 1/1887; H04L 5/006; H04L 65/80;
(Continued)

(56) References Cited

U.S. PATENT DOCUMENTS

| 9,414,404 | B1 | 8/2016 | Travostino et al. |
| 2002/0083364 | A1 | 6/2002 | Christensen et al. |
| 2010/0322124 | A1* | 12/2010 | Luoma .............. H04W 72/1242 370/311 |

(Continued)

FOREIGN PATENT DOCUMENTS

| CN | 102857998 B | 4/2015 |
| CN | 107342899 A | 11/2017 |

(Continued)

OTHER PUBLICATIONS

Extended European Search Report received for corresponding European Patent Application No. 20201527.7, dated Jan. 22, 2021, 8 pages.

(Continued)

*Primary Examiner* — Romani Ohri
(74) *Attorney, Agent, or Firm* — Alston & Bird LLP (57) ABSTRACT

This document discloses a solution for adaptive transmission of data packets. According to an aspect, a method comprises: scheduling a first wireless interface of a user device to operate in a first transmission mode where the first wireless interface transmits payload data to a wireless network; scheduling a second wireless interface of the user device or another user device to operate in a second transmission mode where the second wireless interface transmits keep alive messages without payload data to the wireless network or to another wireless network; receiving at least one measured connection quality metric from the first wireless interface and from the second wireless interfaces; and rescheduling, on the basis of the received connection quality metrics, a transmission mode of at least one of the first wireless interface and the second wireless interface.

20 Claims, 7 Drawing Sheets

(58) Field of Classification Search
CPC ......... H04W 28/0268; H04W 52/0219; H04W 72/1231; H04W 92/18
See application file for complete search history.

(56) References Cited

U.S. PATENT DOCUMENTS

| | | | |
|---|---|---|---|
| 2013/0170389 A1* | 7/2013 | Jee | H04W 36/20 370/332 |
| 2014/0369329 A1 | 12/2014 | Lee et al. | |
| 2016/0111039 A1* | 4/2016 | Iwami | H04N 21/43637 345/520 |
| 2016/0241464 A1 | 8/2016 | Modena et al. | |
| 2016/0338036 A1 | 11/2016 | Pasupuleti et al. | |
| 2017/0223593 A1* | 8/2017 | Koodli | H04W 36/18 |
| 2017/0318502 A1* | 11/2017 | Singh | H04W 76/30 |
| 2017/0339257 A1 | 11/2017 | Kanagarathinam et al. | |
| 2018/0287943 A1 | 10/2018 | Hassan | |
| 2018/0343578 A1* | 11/2018 | Yeoh | H04W 16/14 |
| 2019/0319873 A1* | 10/2019 | Shelar | H04L 45/22 |
| 2019/0364464 A1* | 11/2019 | Shaikh | H04M 15/66 |
| 2020/0084741 A1* | 3/2020 | Chun | H04W 48/02 |
| 2020/0137770 A1* | 4/2020 | Chitrakar | H04L 5/0007 |

FOREIGN PATENT DOCUMENTS

| | | |
|---|---|---|
| EP | 3217753 A1 | 9/2017 |
| WO | 2004/031488 A2 | 4/2004 |
| WO | 2018/013019 A1 | 1/2018 |
| WO | 2018/125686 A2 | 7/2018 |

OTHER PUBLICATIONS

"Bond—Mission Critical Live Video", Teradek, Retrieved on Oct. 12, 2020, Webpage available at : https://teradek.com/collections/bond-family.

"How This Live Production House Always Delivers Solid Live Streams For Clients", Teradek, Retrieved on Oct. 12, 2020, Webpage available at : https://teradek.com/blogs/articles/how-this-live-production-house-foolproofs-its-live-streams.

"HD4 Mbx—Quad Cellular Gigabit LTE Mobile Powerhouse", peplink, Retrieved on Oct. 12, 2020, Webpage available at : https://www.peplink.com/products/x-series-mbx/.

Mogensen et al., "Reliability enhancement for LIE using MPQUIC in a mixed traffic scenario", Master Thesis, Jun. 7, 2018, 108 pages.

Mogensen et al., "Selective Redundant MP-QUIC for 5G Mission Critical Wireless Applications", IEEE 89th Vehicular Technology Conference (VTC2019—Spring), Apr. 28-May 1, 2019, 5 pages.

"Link Pro—Bonded Cellular WiFi Router", Teradek, Retrieved on Oct. 12, 2020, Webpage available at : https://teradek.com/collections/link-pro-family.

Coninck et al., "Multipath QUIC: Design and Evaluation", Proceedings of the 13th International Conference on emerging Networking Experiments and Technologies, 2017, 7 pages.

Office action received for corresponding Finnish Application No. 20195887, dated May 7, 2020, 12 pages.

Communication of Acceptance for Finnish Application No. 20195887 dated Nov. 3, 2021, 9 pages.

* cited by examiner

SELECTIVE TRANSMISSIONS IN WIRELESS DEVICE

FIELD

Various embodiments relate to a multi-radio concept where a device has multiple wireless interfaces to transmit a data stream.

BACKGROUND

Some applications executed in a wireless device such as a smart phone require reliable, high-throughput connectivity. Live video streaming is one use case where continued and uninterrupted service availability often needs to be guaranteed. This is especially true for professional use, e.g. live streaming for commercial broadcasting, but there is also a large and increasing number of semi-professional users who generate live streaming content on platforms such as YouTube®, Facebook®, Twitch®, etc. Even a temporary disruption in the service availability may cause degradation of a quality of service or loss of video content.

BRIEF DESCRIPTION

According to an aspect, there is provided subject matter of independent claims. Dependent claims define some embodiments.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: scheduling a first wireless interface of a user device to operate in a first transmission mode where the first wireless interface transmits payload data to a wireless network; scheduling a second wireless interface of the user device or another user device to operate in a second transmission mode where the second wireless interface transmits keep alive messages without payload data to the wireless network or to another wireless network; receiving at least one measured connection quality metric from the first wireless interface and from the second wireless interfaces; and rescheduling, on the basis of the received connection quality metrics, a transmission mode of at least one of the first wireless interface and the second wireless interface.

In an embodiment, the means are further configured to schedule payload data, addressed to an application server, to multiple wireless interfaces operating in the first transmission mode.

In an embodiment, the means are configured to maintain at least one wireless interface in the first transmission mode while maintaining a plurality of wireless interface in the second transmission mode.

In an embodiment, the means are configured to schedule no payload data to the second wireless interface operating in the second transmission mode.

In an embodiment, the means are configured to schedule payload data to the second wireless interface operating in the second transmission mode for processing on a subset of communication protocol layers supported by the second wireless interface, the subset excluding at least a physical layer.

In an embodiment, the means are further configured to schedule a third wireless interface to an offline mode where the third wireless interface performs no transmissions and reports no measured connection quality metric.

In an embodiment, the means are configured to schedule the third wireless interface to the first transmission mode or the second transmission mode upon receiving, from the third wireless interface, an indication that the third wireless interface is operational.

In an embodiment, the means are configured to reschedule the second wireless interface to the first transmission mode when the first wireless interface is still operating but the connection quality metric associated with the first wireless interface indicates reduced connection quality and when the connection quality metric associated with the second wireless interface indicates connection quality above a threshold.

In an embodiment, the means are configured to perform a decision regarding the rescheduling per payload data packet.

According to an aspect, there is provided an apparatus comprising means for performing: operating in a first transmission mode where the apparatus transmits payload data to a wireless network, measures, in connection with transmitting the payload data, at least one connection quality metric indicating quality of a connection with the wireless network, and transmits, to a scheduler apparatus, a measurement report comprising the at least one connection quality metric; operating in a second transmission mode where the apparatus transmits keep-alive messages without payload data to the wireless network or to another wireless network, measures, in connection with transmitting the keep-alive messages, at least one connection quality metric indicating connection quality, and transmits, to the scheduler apparatus, a measurement report comprising the at least one connection quality metric; receiving, from the scheduler apparatus in response to the measurement report transmitted in the first transmission mode or in the second transmission mode, a scheduling message indicating a new transmission mode; and changing the transmission mode in response to the scheduling message.

In an embodiment, the keep-alive message consists of a header or comprises dummy payload data.

In an embodiment, the means are configured to receive, in the second transmission mode, a payload data from the scheduler, to process the payload data on a subset of communication protocol layers supported by the apparatus, the subset excluding at least a physical layer.

In an embodiment, the means comprises: at least one processor; and at least one memory including computer program code, the at least one memory and computer program code configured to, with the at least one processor, cause the performance of the apparatus.

According to an aspect, there is provided an apparatus comprising: at least one processor; and at least one memory including computer program code, the at least one memory and computer program code configured to, with the at least one processor, cause the apparatus to: schedule a first wireless interface of a user device to operate in a first transmission mode where the first wireless interface transmits payload data to a wireless network; schedule a second wireless interface of the user device or another user device to operate in a second transmission mode where the second wireless interface transmits keep alive messages without payload data to the wireless network or to another wireless network; receive at least one measured connection quality metric from the first wireless interface and from the second wireless interfaces; and reschedule, on the basis of the received connection quality metrics, a transmission mode of at least one of the first wireless interface and the second wireless interface.

According to an aspect, there is provided an apparatus comprising: at least one processor; and at least one memory including computer program code, the at least one memory and computer program code configured to, with the at least one processor, cause the apparatus to: operate in a first transmission mode where the apparatus transmits payload data to a wireless network, measures, in connection with transmitting the payload data, at least one connection quality metric indicating quality of a connection with the wireless network, and transmits, to a scheduler apparatus, a measurement report comprising the at least one connection quality metric; operate in a second transmission mode where the apparatus transmits keep-alive messages without payload data to the wireless network or to another wireless network, measures, in connection with transmitting the keep-alive messages, at least one connection quality metric indicating connection quality, and transmits, to the scheduler apparatus, a measurement report comprising the at least one connection quality metric; receive, from a scheduler apparatus in response to the measurement report transmitted in the first transmission mode or in the second transmission mode, a scheduling message indicating a new transmission mode; and change the transmission mode in response to the scheduling message.

According to an aspect, there is provided a method comprising: scheduling, by a scheduler apparatus, a first wireless interface of a user device to operate in a first transmission mode where the first wireless interface transmits payload data to a wireless network; scheduling, by the scheduler apparatus, a second wireless interface of the user device or another user device to operate in a second transmission mode where the second wireless interface transmits keep alive messages without payload data to the wireless network or to another wireless network; receiving, by the scheduler apparatus, at least one measured connection quality metric from the first wireless interface and from the second wireless interfaces; and rescheduling, by the scheduler apparatus on the basis of the received connection quality metrics, a transmission mode of at least one of the first wireless interface and the second wireless interface.

In an embodiment, the scheduler apparatus schedules payload data, addressed to an application server, to multiple wireless interfaces operating in the first transmission mode.

In an embodiment, the scheduler apparatus maintains at least one wireless interface in the first transmission mode while maintaining a plurality of wireless interface in the second transmission mode.

In an embodiment, the scheduler apparatus schedules no payload data to the second wireless interface operating in the second transmission mode.

In an embodiment, the scheduler apparatus schedules payload data to the second wireless interface operating in the second transmission mode for processing on a subset of communication protocol layers supported by the second wireless interface, the subset excluding at least a physical layer.

In an embodiment, the scheduler apparatus schedules a third wireless interface to an offline mode where the third wireless interface performs no transmissions and reports no measured connection quality metric.

In an embodiment, the scheduler apparatus schedules the third wireless interface to the first transmission mode or the second transmission mode upon receiving, from the third wireless interface, an indication that the third wireless interface is operational.

In an embodiment, the scheduler apparatus reschedules the second wireless interface to the first transmission mode when the first wireless interface is still operating but the connection quality metric associated with the first wireless interface indicates reduced connection quality and when the connection quality metric associated with the second wireless interface indicates connection quality above a threshold.

In an embodiment, the scheduler apparatus performs a decision regarding the rescheduling per payload data packet.

According to an aspect, there is provided a method comprising: operating, by a wireless interface, in a first transmission mode where the wireless interface transmits payload data to a wireless network, measures, in connection with transmitting the payload data, at least one connection quality metric indicating quality of a connection with the wireless network, and transmits, to a scheduler apparatus, a measurement report comprising the at least one connection quality metric; operating, by the wireless interface, in a second transmission mode where the wireless interface transmits keep-alive messages without payload data to the wireless network or to another wireless network, measures, in connection with transmitting the keep-alive messages, at least one connection quality metric indicating connection quality, and transmits, to the scheduler apparatus, a measurement report comprising the at least one connection quality metric; receiving, by the wireless interface from the scheduler apparatus in response to the measurement report transmitted in the first transmission mode or in the second transmission mode, a scheduling message indicating a new transmission mode; and changing, by the wireless interface, the transmission mode in response to the scheduling message.

In an embodiment, the keep-alive message consists of a header or comprises dummy payload data.

In an embodiment, the wireless interface receives, in the second transmission mode, a payload data from the scheduler, processes the payload data on a subset of communication protocol layers supported by the wireless interface, the subset excluding at least a physical layer.

According to an aspect, there is provided a computer program product embodied on a distribution medium readable by a computer, wherein the computer program product comprises a computer program code which, when read and executed by the computer, causes the computer to execute a computer process comprising: scheduling a first wireless interface of a user device to operate in a first transmission mode where the first wireless interface transmits payload data to a wireless network; scheduling a second wireless interface of the user device or another user device to operate in a second transmission mode where the second wireless interface transmits keep alive messages without payload data to the wireless network or to another wireless network; receiving at least one measured connection quality metric from the first wireless interface and from the second wireless interfaces; and rescheduling, on the basis of the received connection quality metrics, a transmission mode of at least one of the first wireless interface and the second wireless interface.

According to an aspect, there is provided a computer program product embodied on a distribution medium readable by a computer, wherein the computer program product comprises a computer program code which, when read and executed by the computer, causes the computer to execute a computer process comprising: operating a wireless interface in a first transmission mode where the wireless interface transmits payload data to a wireless network, measures, in connection with transmitting the payload data, at least one connection quality metric indicating quality of a connection with the wireless network, and transmitting, to a scheduler apparatus, a measurement report comprising the at least one connection quality metric; operating the wireless interface in a second transmission mode where the wireless interface transmits keep-alive messages without payload data to the wireless network or to another wireless network, measures, in connection with transmitting the keep-alive messages, at least one connection quality metric indicating connection quality, and transmitting, to the scheduler apparatus, a measurement report comprising the at least one connection quality metric; receiving, from the scheduler apparatus in response to the measurement report transmitted in the first transmission mode or in the second transmission mode, a scheduling message indicating a new transmission mode; and changing the transmission mode of the wireless interface in response to the scheduling message.

LIST OF DRAWINGS

Some embodiments will now be described with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

Figure 1:
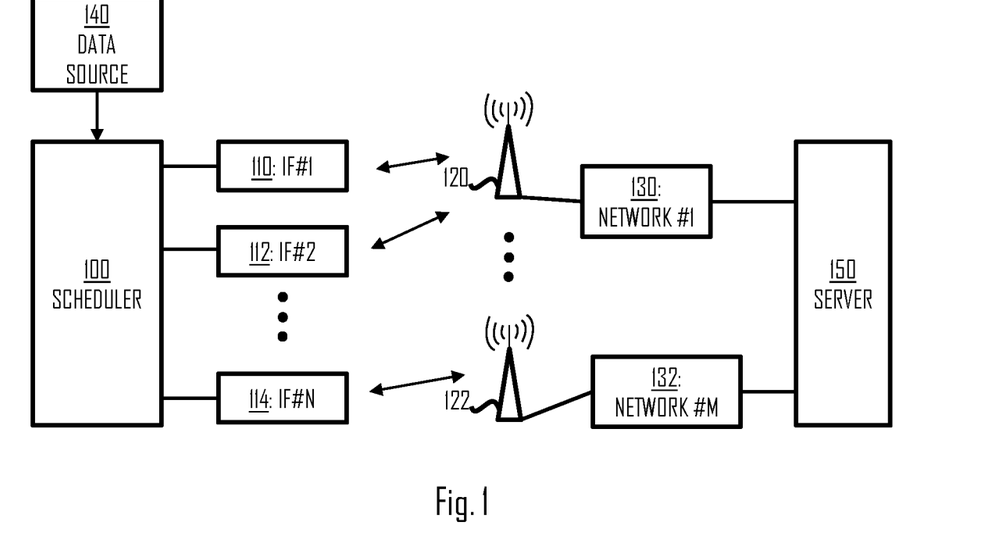
FIG. 1 illustrates a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as EUTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs) or any combination thereof.

FIG. 1 shows wireless devices or wireless interfaces 110, 112, 114 of which each is configured to be in a wireless connection on one or more communication channels with an access node 120, 122 providing wireless access in its respective coverage area. The access node 120 or 122 may be an eNode B or gNode B used in the context of cellular communication protocols such as the LTE and 5G, or it may be an access point of an IEEE 802.11 based wireless network, or it may be an access node or a base station of another wireless network. Each access node 120, 122 may be connected to a respective communication network 130, 132 that provides access to other networks such as the Internet. The networks 130, 132 also provide the wireless interfaces 110 to 114 with connectivity to an application server 150 for communication of data with the server 150.

Each wireless interface 110 to 114 may be associated with the same user device, or the wireless interfaces 110 to 114 may be comprised in separate user devices. In an embodiment, the wireless interface 110 to 114 is a radio modem or a device comprising the radio modem. In an embodiment, at least some of the wireless interfaces comprise a subscriber identification module (SIM).

In an embodiment, the user device comprising the one or more of the wireless interfaces 110 to 114 is a portable computing device such as a mobile phone, a laptop and/or touch screen computer, tablet, game console, notebook, and multimedia device. It should be appreciated that the user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses).

The system illustrated in FIG. 1 comprises a data source 140 that outputs a stream of payload data to be transmitted to the application server 150. The data source may be an application layer computer program generating the payload data. In an embodiment, the data source is a video processing application processing video data captured by a video camera comprised in the user device. The payload data may be output to a scheduler 100 that dynamically schedules the data to one or more of the wireless interfaces 110 to 114 for transmission to the server. As illustrated in FIG. 1, some of the wireless interfaces may be connected to the same access node, e.g. the interfaces 110 and 112 to the access node, while other wireless interfaces may be connected to another access node, such as the interface 114 to the access node 122. Connecting different wireless interfaces to different access nodes and to different networks 130, 132 improves reliability to consistent data transmission. The wireless interfaces may further support different wireless communication protocols, e.g. the interface 110 may support LTE, the interface 112 may support 5G, and the interface 114 may support 802.11 specifications (Wi-Fi).

In an embodiment, the data source is a computer to which the wireless interfaces 110 to 114 may be connected as plug-in devices. The plug-in connectivity may be wired or wireless. The scheduler may be comprised in the computer. The computer may have one or a subset of the wireless interfaces 110 to 114 integrated therein. In another embodiment, the data source, scheduler and the wireless modems are integrated into the same device such as a mobile phone or a tablet computer. Such a device may, however, have capability of connecting, via wire or wirelessly, to additional wireless interfaces.

As mentioned in Background, consistent data transfer capability is important to streaming data transmissions such as video or voice streaming Other forms of data transmission may also require consistent and uninterrupted stream of data. On the other hand, power consumption and usage of network resource are important factors and, as a consequence, reduction of unnecessary transmissions would be advantageous.

Figure 2:
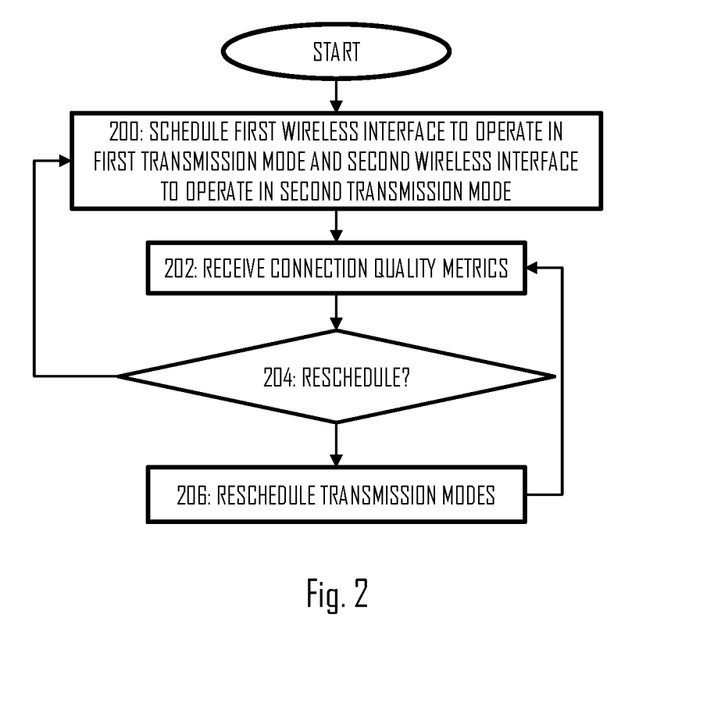
FIG. 2 illustrates a flow diagram of an embodiment for performing selective transmissions in an apparatus.
Figure 3:
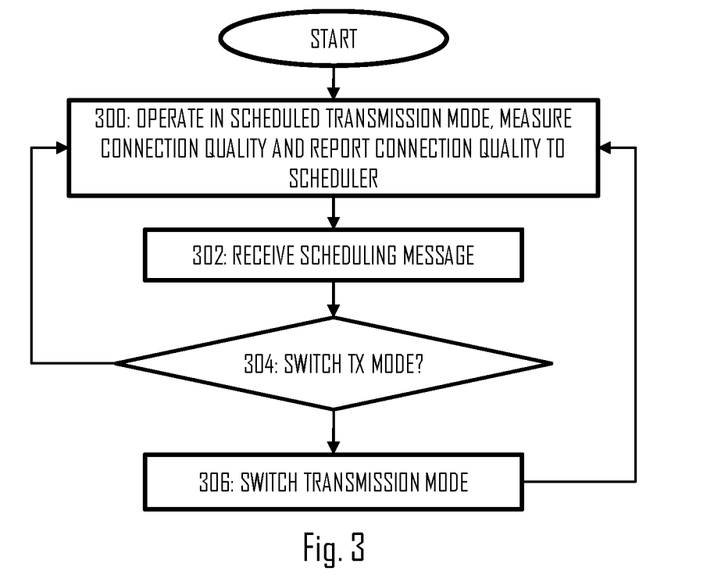
FIG. 3 illustrates a flow diagram of an embodiment for performing transmissions according to a scheduled transmission mode.

FIGS. 2 and 3 illustrate embodiments that employ a plurality of transmission modes for the wireless interfaces 110 to 114. FIG. 2 illustrates an embodiment of a process executed by the scheduler 100 while FIG. 3 illustrates an embodiment of a process executed by the wireless interface 110, 112, 114.

Referring to FIG. 2, the process executed by the scheduler 100 comprises: scheduling (block 200) a first wireless interface of a user device to operate in a first transmission mode where the first wireless interface transmits payload data to a wireless network; scheduling a second wireless interface of the user device or another user device to operate in a second transmission mode where the second wireless interface transmits keep alive messages without payload data to the wireless network or to another wireless network; receiving (block 202) at least one measured connection quality metric from the first wireless interface and from the second wireless interfaces; and rescheduling (blocks 204 and 206), on the basis of the received connection quality metrics, a transmission mode of at least one of the first wireless interface and the second wireless interface.

In an embodiment, block 204 comprises a decision of whether to perform the rescheduling, and the decision is based on the received connection quality metrics. If the connection quality metrics indicate that the second wireless interface is more suitable for the data transmission, the second wireless interface may be rescheduled to operate in the first transmission mode. On the other hand, if the connection quality metrics indicate that the first wireless interface is no longer suitable for the data transmission, the first wireless interface may be rescheduled to operate in the second transmission mode.

Referring to FIG. 3, the wireless interface is configured to operate in the first transmission mode and in the second transmission mode, as scheduled by the scheduler apparatus, and to measure and transmit the connection quality metrics to the scheduler apparatus in both transmission modes. In block 300, the wireless interface operated in one of the transmission modes. In block 302, the wireless interface receives, from the scheduler apparatus in response to a connection quality metric transmitted in the current transmission mode, a scheduling message indicating a new transmission mode. In blocks 304 and 306, the transmission mode is changed in response to the scheduling message, if the scheduling message indicates that the transmission mode shall be changed. If the scheduling message indicates the current transmission mode, the process may return from block 304 to block 300. Upon changing the transmission mode in block 306, the process may return to block 300 in which the apparatus operates in the new transmission mode and measures and reports the connection quality metrics.

The invention provides several advantages. Power savings are achieved by using the second transmission mode to keep a wireless interface ready for transmissions while using reduced amount of transmissions to keep the connection alive. With the same logic, radio resources are saved and interference reduced. Improved reliability is achieved by enabling multiple wireless interfaces to transmit the data packets. Since the scheduler is capable of removing and adding wireless interfaces to the pool of interfaces in the first and/or second transmission mode, flexibility in scheduling transmissions can be achieved. Additionally, lower delay for increasing the transmission capacity can be achieved, as well as capability of scaling the reliability.

In the second transmission mode, the wireless interface transmits the keep-alive messages in order to test the connection quality. Since no payload data is transmitted, power consumption is lower in the second transmission than in the first transmission mode. Another point is that network resources are not wasted for blind duplicates of data packets. However, the same or similar connection quality metric(s) may be measured and, thus, accurate knowledge on the connection quality may be maintained. Additionally, the scheduler 100 may be constantly aware of the wireless interfaces that are capable of successfully transmitting packets.

Figure 4:
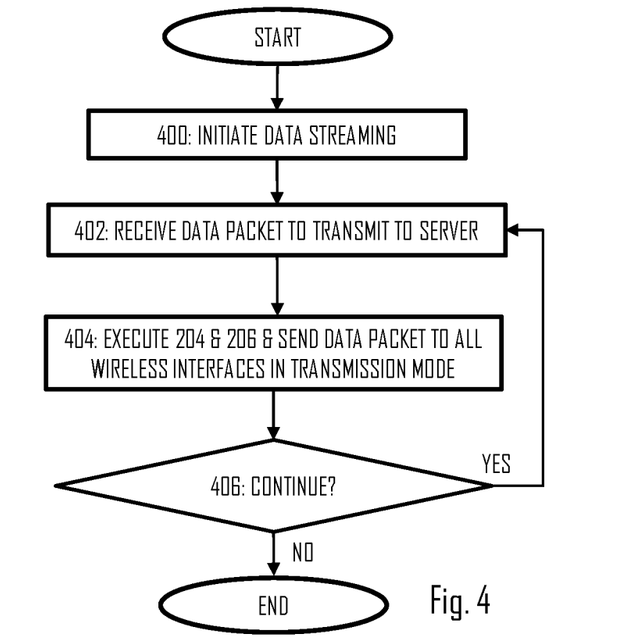
FIG. 4 illustrates an embodiment of FIG. 2.

FIG. 4 illustrates an embodiment of the process of FIG. 2. Referring to FIG. 4, the scheduler 100 may initiate the data streaming to the application server 150 in block 400. Block 400 may comprise receiving a control signal from the data source or from another controller to activate the scheduling of the wireless interfaces. The scheduler or another controller may then control the wireless interfaces 110 to 114 to establish radio connections with the respective access nodes. After the initiation, the scheduler 100 may receive a data packet from the data source 140 to be transmitted to the application server 150 (block 402). In connection with receiving the data packet, the scheduler 100 may execute blocks 204 and 206 (block 404) to perform the rescheduling of the transmission modes for the wireless interfaces and to send the data packet to all the wireless interfaces in a transmission mode. The data packet may be transmitted only to the wireless interface(s) scheduled to operate in the first transmission mode but, in other embodiments, the data packet may be transmitted to the wireless interface(s) scheduled to operate in the first transmission mode and to the wireless interface(s) scheduled to operate in the second transmission mode.

In block 406, it is determined by the scheduler whether to end the transmission of the payload data to the application server. Upon determining to end the data transmission, the process may end and, otherwise, the process may return to block 402 to receive the next data packet. The end of the process may be determined upon receiving no more data packets from the data source or upon disconnecting the connection with the application server 150. In this embodiment, the scheduler performs the decision regarding the rescheduling per payload data packet. In other words, the scheduling of the transmission modes is dynamic and responds quickly to changes in the quality of the radio connections.

In an embodiment, the scheduler maintains a database storing information on the current operational mode of each wireless interface connected to the scheduler 100. The operational modes may include the transmission modes mentioned above and, additionally, an offline mode indicating incapability of performing data transmissions and measuring the connection quality. The first transmission mode may be called an active mode in which the wireless interface transmits payload data and measures and reports the connection quality. The second transmission mode may be called a standby mode in which the wireless interface transmits the keep-alive messages to keep the connection alive and, additionally, measures and reports the connection quality. In some embodiments, the standby mode is a connected mode where the wireless interface regularly exchanges frames with the access node to keep the connection alive and ready for immediate frame transmission. In other embodiments, the standby mode is an idle mode or a power-save mode where the wireless interface employs power-saving and, in some embodiments, does not transmit any frames. For example, cellular protocols define the idle mode while the 802.11 specifications define the power-save mode. The offline mode may be scheduled as a response to a malfunction in a wireless interface, disconnection from a wireless network, a sufficient number of wireless interfaces already in the active mode and in the standby mode, etc.

Figure 5:
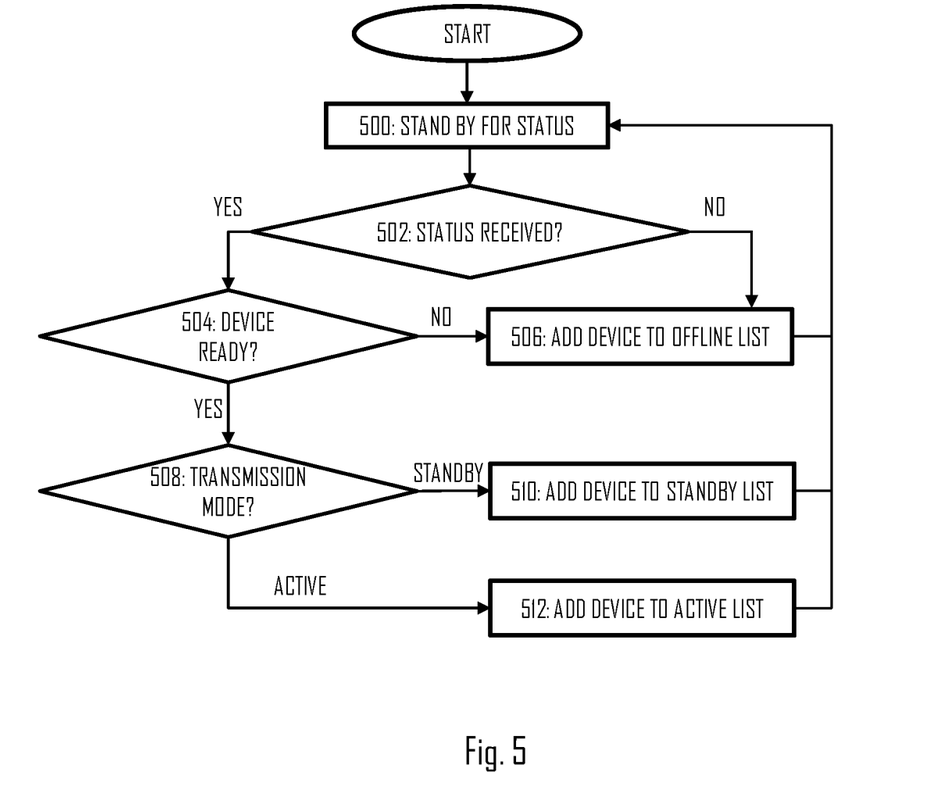
FIG. 5 illustrates an embodiment for selecting an operational mode for a wireless interface.

FIG. 5 illustrates a process for the scheduler to update and maintain the database. The process of FIG. 5 may be carried out for each wireless interface separately. The scheduler may carry out the process of FIG. 5 periodically or otherwise regularly. Referring to FIG. 5, the scheduler may wait for status information from the wireless interface in block 500. The scheduler may request a status update from the wireless interface or configure the wireless interface for periodic or regular reporting. The status information may be received in block 202, i.e. a wireless interface may transmit the status information after each transmission, wherein the transmission may be payload data transmission in the active mode or keep-alive transmission in the standby mode. A wireless interface in the offline mode may also be configured to periodically report its status, e.g. as 'available' or 'unavailable'.

In block 502, it is determined whether the status information is received. If no status information is received within a determined time period, the process may proceed to block 506 where the wireless interface is scheduled to be offline and updated in the database as an offline interface.

If the status information is received, the process may proceed from block 502 to block 504 where it is determined whether the device is ready for a transmission mode, e.g. the active mode and/or the standby mode. If the device indicates to be ready for a transmission mode, the process may proceed to block 508 where an operational mode is selected for the wireless interface. Otherwise, the process may proceed to block 506. In block 506, the offline mode is selected for the wireless interface. The decision may be based on one or more of the following parameters: a total number of wireless interfaces currently in the active mode, a total number of wireless interfaces currently in the standby mode, a number of redundant connections needed, reported quality of connections currently of the wireless interfaces currently in the active mode and in the standby mode, and state of previous transmissions (successful or not). The scheduler may store and use preference or threshold values for each parameter.

For example, if the number of devices currently in the active mode and/or in the standby mode is below a threshold and the wireless interface is currently in the offline mode, the scheduler may proceed from block 508 to block 510 or 512. And similarly, if the number of devices currently in the active mode and/or in the standby mode is above the threshold and the wireless interface is currently in the active or standby mode, the scheduler may proceed from block 504 to 506. In block 510, the scheduler schedules the wireless interface to operate in the standby mode and updates the database accordingly. In block 512, the scheduler schedules the wireless interface to operate in the active mode and updates the database accordingly. If number of devices currently in the active mode and/or in the standby mode is above the threshold and the wireless interface is currently in the offline mode, the scheduler may maintain the offline mode and return to block 500.

As another example, if the wireless interface is currently in the standby mode and the number of devices in the active mode is below a threshold, the process may proceed from block 508 to 512. The threshold may define a number of concurrent active transmission paths the scheduler needs to reach a desired level of reliability through redundancy of transmissions. The same payload data may be transmitted through all wireless interfaces concurrently in the active mode. On the other hand, if the wireless interface is currently in the active mode and the number of devices in the active mode is above the threshold, the process may proceed from block 508 to 510.

As yet another example, if the number of wireless interfaces in the active mode and/or in the standby mode is sufficient but the reported quality of connections indicate a need for an additional wireless interface to be added to the active list or the standby list and the wireless interface is in the offline mode, the process may proceed to block 510 or 512. In a similar manner, if the wireless interface is in the standby mode or offline mode, and the number of wireless interfaces in the active mode is on the desired level but that one or more of the wireless interfaces reports failed transmissions or otherwise degrading or low connection quality, the scheduler may proceed from block 508 to 512. Further scenarios for performing the rescheduling can be envisaged.

In an embodiment, the scheduler is configured to maintain at least one wireless interface in the first transmission mode while maintaining a plurality of wireless interface in the second transmission mode.

In an embodiment, the scheduler is configured to maintain a plurality of wireless interfaces in the first transmission mode while maintaining a plurality of wireless interface in the second transmission mode.

Figure 6:
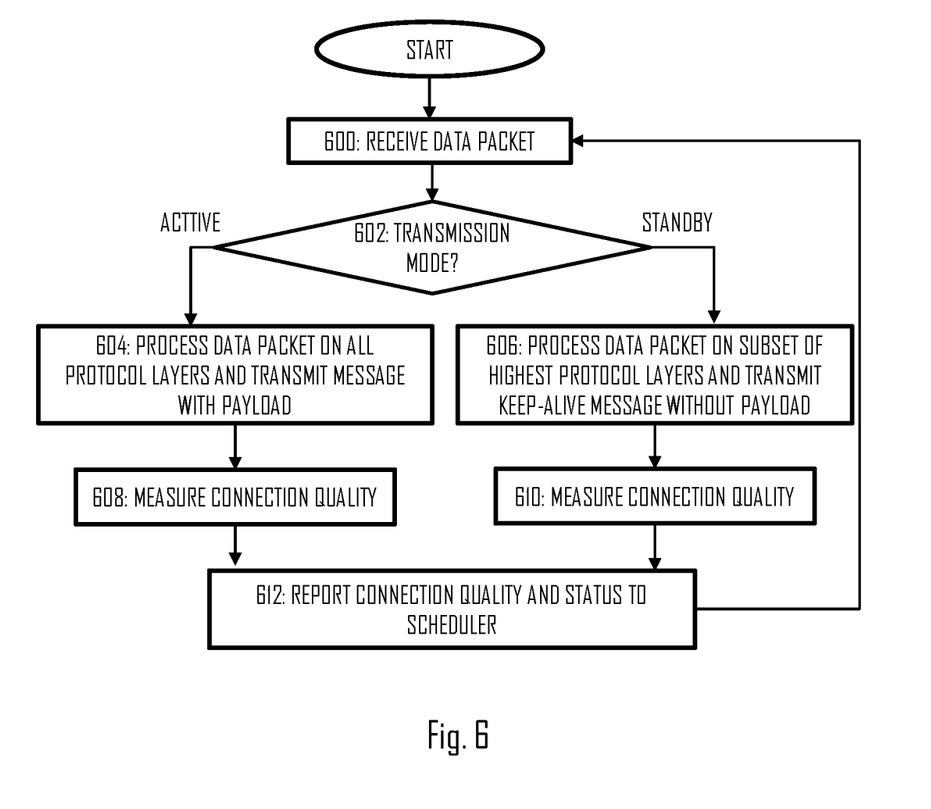
FIG. 6 illustrates an embodiment of processing a data packet in a wireless interface in various transmission modes.

As described above, the scheduler may send the payload data packet to all wireless interfaces in the first transmission mode (active mode) and, additionally, to all wireless interfaces in the second transmission mode (standby mode). FIG. 6 illustrates a process for the wireless interface to process the data packet in each transmission mode. The data packet may be an internet protocol (IP) data packet. Upon receiving a data packet in block 600, the wireless interface may determine its current operational mode in block 602. If the operational mode is the first transmission mode (the active mode), the process may proceed to block 604 where the wireless interface processes the data packet on all communication protocol layers and transmits the data packet in one or more messages carrying the data packet as payload. In block 608, the wireless interface measures the connection quality. The measurement may be based on measuring a signal strength of a signal received from the respective access node to which the one or more messages are transmitted, or it may be based on measuring a number of retransmissions needed to successfully deliver the one or more messages, or it may be another metric representing a channel quality between the wireless interface and the respective access node. A wireless supporting 802.11 specifications, or a listen-before-talk protocol may measure the connection quality by performing channel sounding in a clear channel assessment procedure in which a channel is sensed and determined to be busy or free. In such a case, the wireless interface may measure a duration the channel is sensed to be busy and determine the connection quality on that basis. A long duration of sensed busy channel may be an indicative of poor connection quality because channel access probability is reduced. Other forms of measuring the connection quality are equally possible. In block 612, the wireless interface reports the connection quality in the status information to the scheduler.

If the operational mode is the second transmission mode (the standby mode), the process may proceed to block 606 where the wireless interface processes the data packet on a subset of the communication protocol layers, excluding at least a physical layer. In an embodiment, medium access control processing is also excluded. In other words, the payload data is processed only on a subset of highest protocol layers, but the wireless interface may execute the lower protocol layer(s) as well to transmit the keep-alive message. In other words, the lowest protocol layer(s) are processed without the payload data. Block 606 may also comprise transmission of the keep-alive message(s) without the payload data. In an embodiment, the keep-alive message consists of a header and carries no payload data part. In another embodiment, the keep-alive message comprises the payload data part, but the payload data part comprises only dummy data. The size of such a keep-alive message may also be the shortest possible for delivering payload data. In block 610, the wireless interface measures the connection quality. The measurement may be similar to that of block 608, e.g. radio signal measurements and/or measuring the number of retransmissions needed to successfully deliver the keep-alive message. From block 610, the process may proceed to block 612 to report the connection quality in the status information.

In an embodiment, if the connection with the serving access node breaks during block 604 or 606, the wireless interface may report an offline mode to the scheduler in block 612. The wireless interface may equally report the offline mode upon determining the channel to be too congested or upon detecting signal or channel quality too low. The scheduler may then reschedule the wireless interface to the offline mode in block 506.

Figure 7:
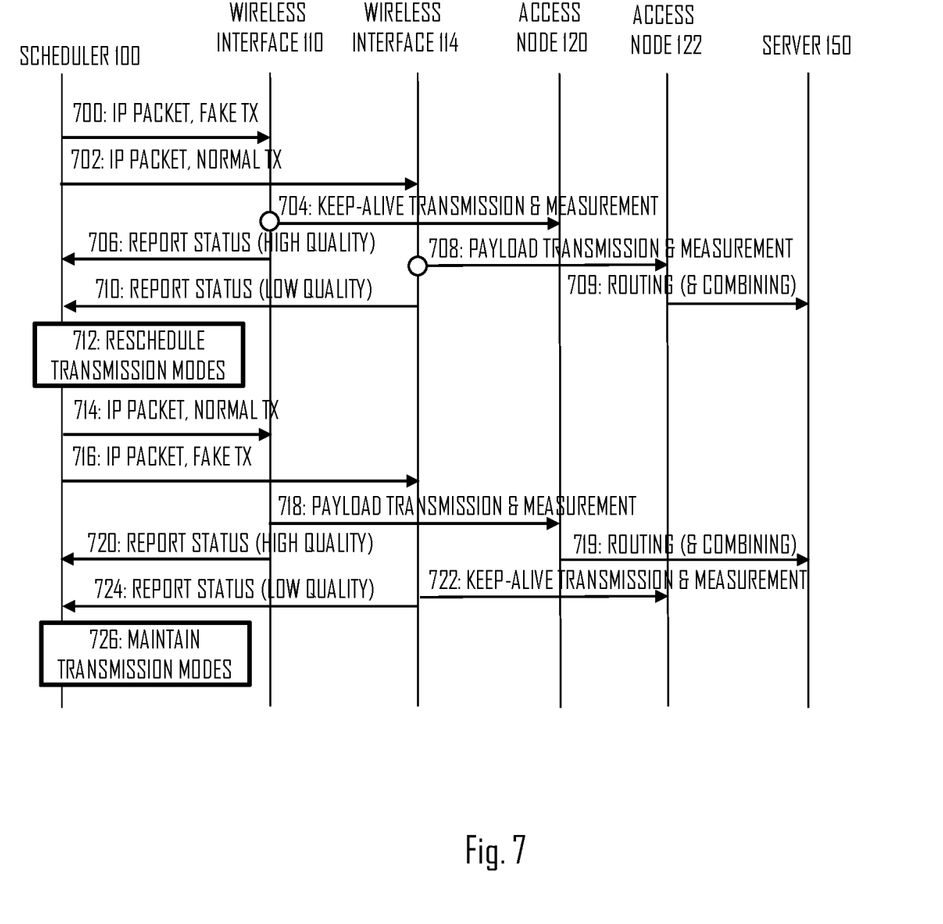
FIG. 7 illustrates a signalling diagram for dynamically rescheduling transmission modes according to an embodiment.

In an embodiment, the scheduler reschedules a wireless interface to the second transmission mode (the standby mode) when the wireless interface is still operating but the connection quality metric associated with the wireless interface indicates reduced connection quality and when the connection quality metric associated with another wireless interface indicates connection quality above a threshold. The other wireless interface may, at the same time, be scheduled to the first transmission mode (the active mode). FIG. 7 illustrates a signalling diagram of such an embodiment.

FIG. 7 illustrates the scheduler, wireless interfaces 110 and 114 connected to the respective access nodes 120 and 122, and the application server 150. As described above, the wireless interface 110 and/or 114 may be comprised in the same apparatus as the scheduler 100 and, thus, the signalling may be internal, e.g. within one circuit or multiple circuits provided in the same casing or circuit board. Alternatively, the wireless interface 110 and/or 114 may be physically separated from the scheduler such that the signalling between the scheduler and the wireless interface(s) is wireless. The signalling between the wireless interfaces 110, 114 and the respective access nodes 120, 122 may be wireless.

Referring to FIG. 7, the scheduler schedules a data packet and the information on the scheduled transmission mode to the wireless interface 110 in step 700. Now, the scheduler schedules the wireless interface 110 to operate in the standby mode and to carry out the keep-alive transmission that can also be considered as a fake transmission (TX) because no actual payload data is transmitted. In step 702, the scheduler schedules the (same) data packet and the information on the scheduled transmission mode to the wireless interface 114. The scheduler schedules the wireless interface 114 to operate in the active mode and to carry out the real transmission of the data packet. In step 704, the wireless interface 110 carries out the keep-alive transmission that keeps the connection with the access node 120 alive and active, e.g. in a radio resource control (RRC) connected mode. Meanwhile, the wireless interface 110 measures the connection quality and reports the connection quality and the status information of the wireless interface 110 to the scheduler (step 706). As described above, the measurement may include measuring a signal received from the access node 120 and generating the connection quality metric and/or it may include counting a number of retransmissions needed to deliver the keep-alive message(s).

In step 708, the wireless interface 114 carries out the transmission of the data packet in the form of one or multiple physical layer or medium access control layer messages, and the data packet is delivered to the server 150 in step 709. The wireless interface 114 also carries out the measurement of the connection quality and reports the connection quality and the status information to the scheduler 100 in step 710. As described above, the measurement may include measuring a signal received from the access node 122 and generating the connection quality metric and/or it may include counting a number of retransmissions needed to deliver the message(s) to the access node 122. In step 709, the data packet is routed to the application server and, optionally, combined with other duplicates of the data packet, if such has been generated in the data source or at the scheduler. The duplicates may be combined at the application server, at the access node, or at any point between the access node and the application server, depending on the implementation. The wireless interface 114 may report in step 710 of the success/failure of the transmission of the data packet as well. In step 706, the wireless interface 110 reports high connection quality while the wireless interface 114 reports low connection quality in step 710. The definitions 'high' and 'low' may be made with respect to a threshold, for example. Based on the reported connection quality, the scheduler may perform the rescheduling in block 712, and the determine to switch the wireless interface 110 to the active mode and the wireless interface 114 to the standby mode. As a consequence, the scheduler schedules a new data packet and the information on the scheduled transmission mode to the wireless interface 110 in step 714. Now, the scheduler schedules the wireless interface 110 to operate in the active mode and to carry out real transmission of the new data packet. In step 716, the scheduler schedules the (same) data packet and the information on the scheduled transmission mode to the wireless interface 114. The scheduler schedules the wireless interface 114 to operate in the standby mode and to carry out the keep-alive transmission.

In step 718, the wireless interface 110 carries out the transmission of the data packet in the form of one or multiple physical layer or medium access control layer messages, and the data packet is delivered to the server 150 in step 719. The wireless interface 110 also carries out the measurement of the connection quality and reports the connection quality and the status information to the scheduler 100 in step 720. The wireless interface 110 may report in step 710 of the success/failure of the transmission of the new data packet as well. In step 722, the wireless interface 114 carries out the keep-alive transmission that keeps the connection with the access node 122 alive and active. Meanwhile, the wireless interface 114 measures the connection quality and reports the connection quality and the status information of the wireless interface 114 to the scheduler (step 724).

In step 720, the wireless interface 110 still reports high connection quality while the wireless interface 114 reports low connection quality in step 724. Based on the reported connection quality, the scheduler may determine to maintain the transmission modes in block 726, and the next data packet may be scheduled in the same manner as in steps 714 and 716.

In block 712, the scheduler may reschedule the wireless interfaces 110, 114 substantially concurrently. In another embodiment, the scheduler first reschedules the wireless interface 110 to the active mode before rescheduling the wireless interface 14 to the standby mode. This principle ensures that a sufficient number of wireless interfaces is at any time instant scheduled to the active transmission mode.

As described above, the scheduler may operate a higher number of wireless interfaces including more wireless interfaces scheduled to the standby mode and/or to the active mode. Some of the wireless interfaces may be in the offline mode, as described above. The scheduler may schedule the transmission modes of each wireless interface, as described above in connection with FIG. 5.

Figure 8:
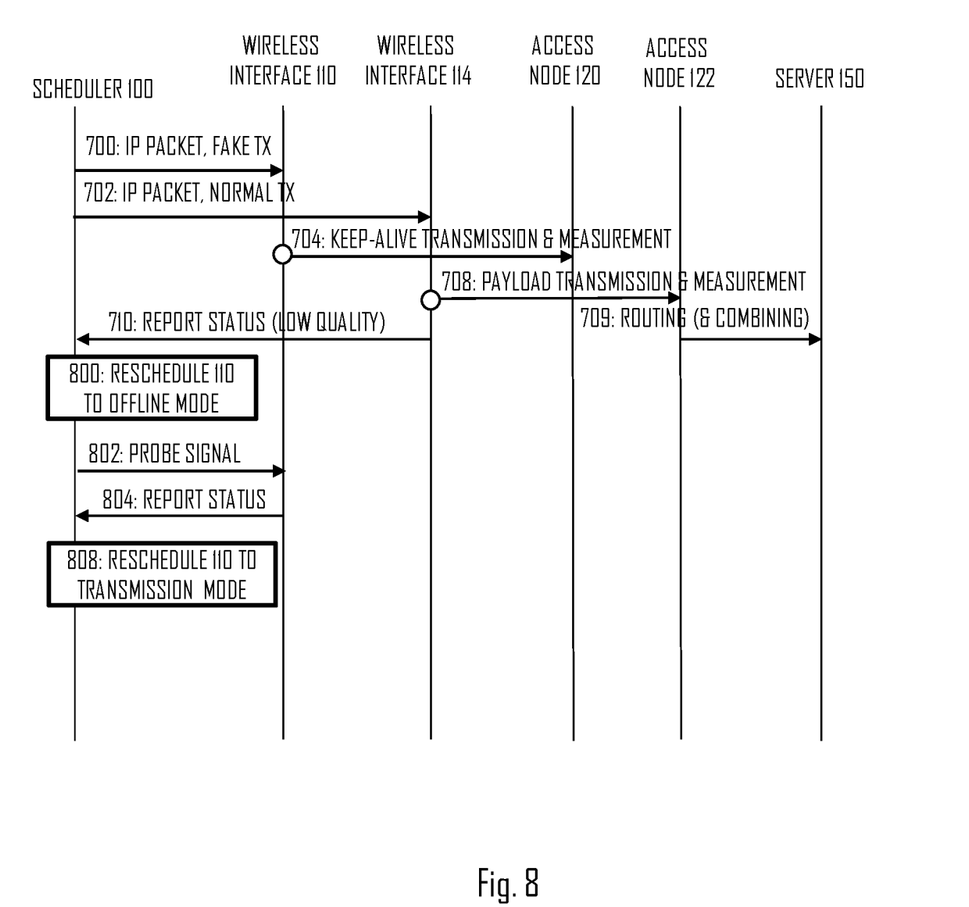
FIG. 8 illustrates a signalling diagram for dynamically rescheduling operational modes according to an embodiment.

FIG. 8 illustrates yet another signalling diagram, of an embodiment where a wireless interface scheduled to operate in one of the transmission modes abruptly goes silent. In FIG. 8, the same reference numbers as in FIG. 7 represent the same or substantially similar operations. After scheduling the data packet in step 700, the wireless interface 110 goes silent and does not report the status information and the connection quality (step 706 is missing). As a consequence, the scheduler may immediately schedule the wireless interface 110 to the offline mode in block 800 and, optionally, schedule another wireless interface from the offline mode to the standby mode or even the active mode, if the wireless interface 114 reports the low connection quality. After scheduling the wireless interface to the offline mode, the scheduler may keep probing the wireless interface 110 in step 802. The probing may comprise sending a signal to the wireless interface 110 and waiting for a response signal.

After receiving a response signal from the wireless interface 110 (step 804), indicating that the wireless interface 110 is operational once again, the scheduler 100 may reschedule the wireless interface to one of the transmission modes (step 808), if deemed necessary.

Figure 9:
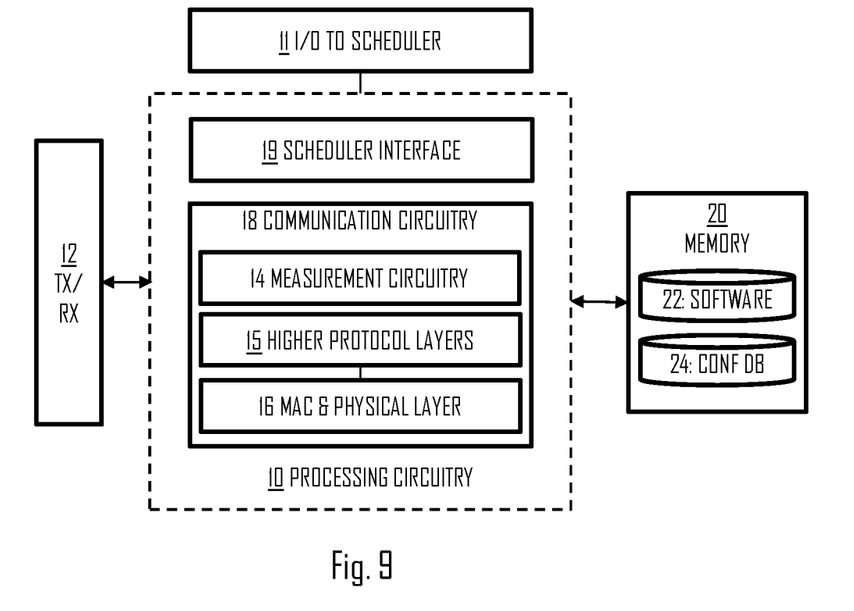
FIGS. 9 and 10 illustrate embodiments of structures of apparatuses.

FIG. 9 illustrates an embodiment of a structure of the above-mentioned functionalities of an apparatus executing the functions of the wireless interface 110 to 114 in the embodiments described above. The apparatus may be a terminal device or a client device of a wireless network, e.g. an LTE, Wi-Fi, or 5G based cellular communication network. In other embodiments, the apparatus may be a circuitry or an electronic device realizing some embodiments of the invention in the wireless interface. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention of the wireless interface 110 to 114.

Referring to FIG. 9, the apparatus may comprise a processing circuitry 10 comprising a communication circuitry 18 providing the apparatus with capability of communicating in the wireless network of one or more of the access node 120, 122. The apparatus may support one communication protocol or a plurality of communication protocols. The communication circuitry 18 may employ a radio interface 12 providing the apparatus with radio communication capability. The radio interface 12 may support uplink frame transmissions to transmit the data packets in one or more physical layer messages, e.g. frames or sub-frames. It may comprise components such as an amplifier, filter, frequency-converter, (de)modulator, and encoder/decoder circuitries and one or more antennas.

In an embodiment, the apparatus is a radio modem configured to carry out the embodiments of the wireless interface 110 to 114. In another embodiment, the radio modem is comprised in the radio interface 12. In yet another embodiment, the communication circuitry is configured to carry out digital signal processing and at least some functions of the medium access control (MAC) layer and the physical layer (block 16). The radio interface 12 may carry out analog signal processing functions. The communication circuitry 18 may further carry out signal processing on higher protocol layers 15 such as a radio link control layer and a packet data convergence layer (PDCP), for example. The communication circuitry 18 may further comprise a measurement circuitry 14 configured to measure the connection quality, as described above. The measurement circuitry 14 may employ the radio interface 12 to carry out at least some of the measurement tasks, e.g. channel sensing.

The processing circuitry 10 may further comprise a scheduler interface 19 configured to communicate with the scheduler 100 via the radio interface 12 or via an internal input/output interface 11, as described above. The scheduler interface 19 may be configured to generate and report the connection quality and the status information to the scheduler, as described above.

The processing circuitry 10 may comprise at least one processor. The apparatus may further comprise a memory 20 storing one or more computer program products 22 configuring the operation of said processor(s) of the apparatus. The memory 20 may further store a configuration database 24 storing operational configurations of the apparatus. The configuration database 24 may, for example, store the current operational mode of the wireless interface, e.g. one of the transmission modes.

Figure 10:
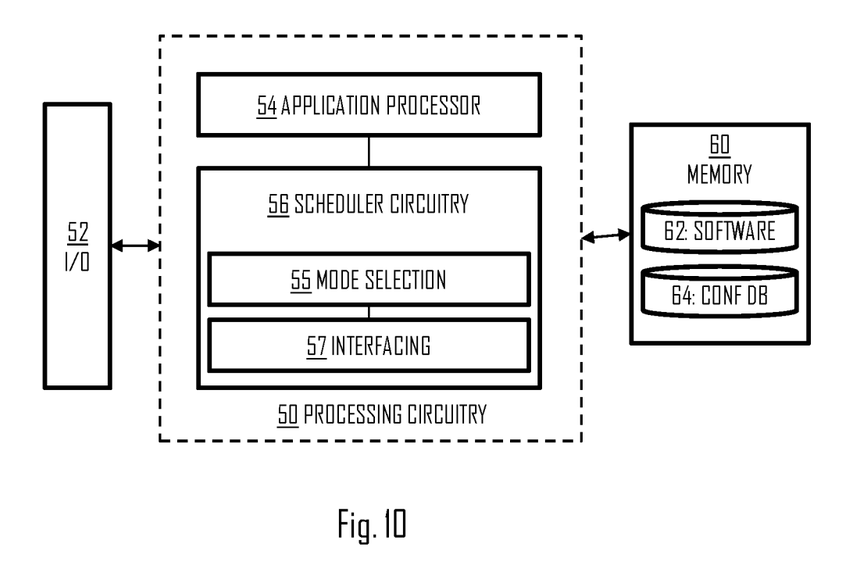

FIG. 10 illustrates an embodiment of a structure of the above-mentioned functionalities of an apparatus executing the functions of the scheduler 100 in the embodiments described above. The apparatus may be a computer (PC), a laptop, a tablet computer, a cellular phone, a palm computer, a sensor device, or any other apparatus generating payload data and needing to transmit the data to the server or to another device over at least one wireless interface. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention. The apparatus may have one of the wireless interfaces 110 to 114 and/or it may utilize external wireless interfaces, as described above.

Referring to FIG. 10, the apparatus may comprise a processing circuitry 50 comprising a scheduler circuitry 56 configured to carry out the above-described functions of the scheduler 100. The scheduler circuitry 56 may employ a communication interface 52 providing the apparatus with communication capability with the wireless interfaces 110 to 114. The communication interface 52 may be a radio interface, or it may be an internal wired interface, as described above. In case the communication interface is the radio interface, it may employ a different communication protocol than the communication protocol(s) employed by the wireless interfaces towards the respective access nodes 120, 122. For example, the communication interface may support a low-range communication protocol such as Bluetooth® or another IEEE 802.15-based protocol, or another short-range protocol. In such a case, the wireless interfaces may support multiple radio communication protocols: one towards the scheduler and another towards the access node(s).

The scheduler circuitry 56 may comprise an interfacing circuitry 57 configured to carry out communication with the wireless interfaces, to receive the status information from the wireless interfaces and to transmit the scheduling information to the wireless interfaces. The scheduler circuitry 56 may further comprise a mode selection circuitry 55 configured to process the received status information and to select an operational mode for the wireless interfaces, e.g. as described above in connection with FIG. 5.

The apparatus may further comprise an application processor 54 executing one or more computer program applications that generate a need to transmit (and receive) data with the server 150. The application processor 54 may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate the payload data to be transmitted to the server 150.

The processing circuitry 50 may comprise at least one processor. The apparatus may further comprise a memory 60 storing one or more computer program products 62 configuring the operation of said processor(s) of the apparatus. The memory 60 may further store a configuration database 64 storing operational configurations of the apparatus. The configuration database 64 may, for example, store the database listing a current operational status of each of the wireless interfaces 110 to 114.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multicore processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 8 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:
1. An apparatus comprising:
at least one processor; and
at least one memory including computer program code, the at least one memory and computer program code configured to, with the at least one processor, cause the apparatus to:

schedule a first wireless interface, associated with a user device, of a plurality of wireless interfaces to operate in a first transmission mode where the first wireless interface transmits payload data to a wireless network;

schedule a second wireless interface, associated with the user device or another user device, of the plurality of wireless interfaces to operate in a second transmission mode where the second wireless interface transmits keep alive messages without payload data to the wireless network or to another wireless network in order to (i) maintain a connection to the wireless network or to the another wireless network and to (ii) test a connection quality of the wireless network or the another wireless network;

receive at least one measured connection quality metric from the first wireless interface and from the second wireless interface, wherein the at least one measured connection quality metric from the second wireless interface comprises at least the tested connection quality of the wireless network or the another wireless network, and wherein the at least one measured connection quality metric is used to update a database comprising an operational mode of respective ones of the plurality of wireless interfaces and a plurality of connection quality metrics for the respective ones of the plurality of wireless interfaces; and reschedule, based on information stored in the database associated with the first wireless interface and the second wireless interface, a transmission mode of at least one of the first wireless interface and the second wireless interface.

2. The apparatus of claim 1, wherein the at least one memory and computer program code further configured to, with the at least one processor, cause the apparatus to schedule payload data, addressed to an application server, to multiple wireless interfaces operating in the first transmission mode.

3. The apparatus of claim 1, wherein the at least one memory and computer program code configured to, with the at least one processor, cause the apparatus to maintain at least one wireless interface in the first transmission mode while maintaining a plurality of wireless interface in the second transmission mode.

4. The apparatus of claim 1, wherein the at least one memory and computer program code configured to, with the at least one processor, cause the apparatus to schedule no payload data to the second wireless interface operating in the second transmission mode.

5. The apparatus of claim 1, wherein the at least one memory and computer program code configured to, with the at least one processor, cause the apparatus to schedule payload data to the second wireless interface operating in the second transmission mode for processing on a subset of communication protocol layers supported by the second wireless interface, the subset excluding at least a physical layer.

6. The apparatus of claim 1, wherein the at least one memory and computer program code further configured to, with the at least one processor, cause the apparatus to schedule a third wireless interface to an offline mode where the third wireless interface performs no transmissions and reports no measured connection quality metric.

7. The apparatus of claim 6, wherein the at least one memory and computer program code configured to, with the at least one processor, cause the apparatus to schedule the third wireless interface to the first transmission mode or the second transmission mode upon receiving, from the third wireless interface, an indication that the third wireless interface is operational.

8. The apparatus of claim 1, wherein the at least one memory and computer program code configured to, with the at least one processor, cause the apparatus to reschedule the second wireless interface to the first transmission mode when the first wireless interface is still operating but the connection quality metric associated with the first wireless interface indicates reduced connection quality and when the connection quality metric associated with the second wireless interface indicates connection quality above a threshold.

9. The apparatus of claim 1, wherein the at least one memory and computer program code configured to, with the at least one processor, cause the apparatus to perform a decision regarding the rescheduling per payload data packet.

10. A method comprising:

scheduling a first wireless interface, associated with a user device, of a plurality of wireless interfaces to operate in a first transmission mode where the first wireless interface transmits payload data to a wireless network;

scheduling a second wireless interface, associated with the user device or another user device, of the plurality of wireless interfaces to operate in a second transmission mode where the second wireless interface transmits keep alive messages without payload data to the wireless network or to another wireless network in order to (i) maintain a connection to the wireless network or to the another wireless network and to (ii) test a connection quality of the wireless network or the another wireless network;

receiving at least one measured connection quality metric from the first wireless interface and from the second wireless interface, wherein the at least one measured connection quality metric from the second wireless interface comprises at least the tested connection quality of the wireless network or the another wireless network, and wherein the at least one measured connection quality metric is used to update a database comprising an operational mode of respective ones of the plurality of wireless interfaces and a plurality of connection quality metrics for the respective ones of the plurality of wireless interfaces; and rescheduling, by the scheduler apparatus based on information stored in the database associated with the received connection quality metrics for the first wireless interface and the second wireless interface, a transmission mode of at least one of the first wireless interface and the second wireless interface.

11. The method of claim 10, wherein the method further comprises scheduling pay-load data, addressed to an application server, to multiple wireless interfaces operating in the first transmission mode.

12. The method of claim 10, wherein the method comprises maintaining at least one wireless interface in the first transmission mode while maintaining a plurality of wireless interface in the second transmission mode.

13. The method of claim 10, wherein the method comprises scheduling no payload data to the second wireless interface operating in the second transmission mode.

14. The method of claim 10, wherein the method comprises scheduling payload data to the second wireless interface operating in the second transmission mode for processing on a subset of communication protocol layers supported by the second wireless interface, the subset excluding at least a physical layer.

15. The method of claim 10, wherein the method further comprises scheduling a third wireless interface to an offline mode where the third wireless interface performs no transmissions and reports no measured connection quality metric.

16. A non-transitory computer readable medium comprising program instructions for causing an apparatus to perform at least the following:

scheduling a first wireless interface, associated with a user device, of a plurality of wireless interfaces to operate in a first transmission mode where the first wireless interface transmits payload data to a wireless network;

scheduling a second wireless interface, associated with the user device or another user device, of the plurality of wireless interfaces to operate in a second transmission mode where the second wireless interface transmits keep alive messages without payload data to the wireless network or to another wireless network in order to (i) maintain a connection to the wireless network or to the another wireless network and to (ii) test a connection quality of the wireless network or the another wireless network;

receiving at least one measured connection quality metric from the first wireless interface and from the second wireless interface, wherein the at least one measured connection quality metric from the second wireless interface comprises at least the tested connection quality of the wireless network or the another wireless network, and wherein the at least one measured connection quality metric is used to update a database comprising an operational mode of respective ones of the plurality of wireless interfaces and a plurality of connection quality metrics for the respective ones of the plurality of wireless interfaces; and rescheduling, based on information stored in the database associated with the first wireless interface and the second wireless interface, a transmission mode of at least one of the first wireless interface and the second wireless interface.

17. The non-transitory computer readable medium of claim 16, wherein the program instructions for causing an apparatus to perform further comprises scheduling payload data, addressed to an application server, to multiple wireless interfaces operating in the first transmission mode.

18. The non-transitory computer readable medium of claim 16, wherein the program instructions for causing an apparatus to perform comprises maintaining at least one wireless interface in the first transmission mode while maintaining a plurality of wireless interface in the second transmission mode.

19. The non-transitory computer readable medium of claim 16, wherein the program instructions for causing an apparatus to perform comprises scheduling no payload data to the second wireless interface operating in the second transmission mode.

20. The non-transitory computer readable medium of claim 16, wherein the program instructions for causing an apparatus to perform comprises scheduling payload data to the second wireless interface operating in the second transmission mode for processing on a subset of communication protocol layers supported by the second wireless interface, the subset excluding at least a physical layer.

* * * * *

UNITED STATES PATENT AND TRADEMARK OFFICE
CERTIFICATE OF CORRECTION

PATENT NO. : 11,641,663 B2
APPLICATION NO. : 17/068237
DATED : May 2, 2023
INVENTOR(S) : Lars Holst Christensen et al.

Page 1 of 1

It is certified that error appears in the above-identified patent and that said Letters Patent is hereby corrected as shown below:

In the Claims

In Column 18, Line 45, Claim 10, delete "by the scheduler apparatus based" and insert -- based --, therefor.

In Column 18, Lines 46-47, Claim 10, delete "with the received connection quality metrics for" and insert -- with --, therefor.

In Column 18, Line 52, Claim 11, delete "pay-load" and insert -- payload --, therefor.

Signed and Sealed this
Fifth Day of September, 2023

Katherine Kelly Vidal
*Director of the United States Patent and Trademark Office*